(12) United States Patent
Sadri et al.

(10) Patent No.: US 7,639,643 B2
(45) Date of Patent: Dec. 29, 2009

(54) CHANNEL ESTIMATION FEEDBACK IN AN ORTHOGONAL FREQUENCY DIVISION MULTIPLEXING SYSTEM OR THE LIKE

(75) Inventors: Ali S. Sadri, San Diego, CA (US); Alexander A. Maltsev, Nizhny Novgorod (RU); Valery V. Cherepennikov, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 834 days.

(21) Appl. No.: 10/665,939

(22) Filed: Sep. 17, 2003

(65) Prior Publication Data

US 2005/0058095 A1 Mar. 17, 2005

(51) Int. Cl.
*H04J 4/00* (2006.01)
(52) U.S. Cl. .................. 370/329; 370/278; 370/252
(58) Field of Classification Search .............. 370/329, 370/252, 278; 375/221, 260, 267
See application file for complete search history.

(56) References Cited

U.S. PATENT DOCUMENTS

| | | | |
|---|---|---|---|
| 6,785,341 B2 | 8/2004 | Walton | |
| 2002/0101840 A1* | 8/2002 | Davidsson et al. | 370/330 |
| 2002/0181389 A1* | 12/2002 | Giannakis et al. | 370/208 |
| 2003/0035491 A1* | 2/2003 | Walton et al. | 375/267 |
| 2003/0043778 A1* | 3/2003 | Luschi et al. | 370/349 |
| 2003/0086371 A1* | 5/2003 | Walton et al. | 370/235 |
| 2003/0095508 A1* | 5/2003 | Kadous et al. | 370/252 |
| 2003/0128656 A1* | 7/2003 | Scarpa | 370/203 |
| 2003/0235162 A1* | 12/2003 | Chao et al. | 370/329 |
| 2004/0005010 A1* | 1/2004 | He et al. | 375/260 |
| 2006/0262750 A1* | 11/2006 | Walton et al. | 370/329 |

OTHER PUBLICATIONS

Jarot S P W et al., "Each Carrier Transmission Power Control for the Reverse Link of OFDM-DS-CDMA System" IEICE Trans. Commun., vol. E82-B, No. 11, Nov. 99, pp. 1851-1857.
International Application Serial No. PCT/US200/030385, International Search Report dated Apr. 20, 2005, 6 pgs.
*International Application Serial* No. PCT/US200/030385, Written Opinion dated Apr. 20, 2005, 8 pgs.
R.O.C. Application Serial No. 92128043, Office Action dated Jan. 12, 2006, 2 pgs.
*Malaysian Application Serial* No. PI 20043652, Substantive Examination Adverse Report dated Feb. 6, 2008, 4 pgs.
European Application Serial No. 04784291.9, Office Action dated Aug. 6, 2008, 6 pgs.
Chinese Application Serial No. 200480026685.1, Office Action dated Nov. 14, 2008, 22 pgs.
"European Application Serial No. 04784291.9, Office Action mailed Aug. 6, 2008", 6 pgs.
"International Application Serial No. PCT/US2004/030385, Search Report dated Apr. 20, 2005", 6 pgs.
"Substantive Examination Adverse Report", *Malaysian Application* No. PI 20043652, 4 pgs.
"Written Opinion", *International Application* No. PCT/US2004/030385, 8 pgs.
"Supplement to IEEE Standard for Information Technology- Telecommunications and Information Exchange Between Systems- Local and Metropolitan Area Networks—Specific Requirements—Part 11: Wireless LAN Medium Access Control (MAC) and Physical Layer (PHY) Specifications: High-Speed Physical Layer in the 5 GHZ Band", *IEEE Std 802.11A-1999*, (Dec. 30, 1999), 90 pgs.

(Continued)

*Primary Examiner*—Charles N Appiah
*Assistant Examiner*—Kwasi Karikari
(74) *Attorney, Agent, or Firm*—Schwegman, Lundberg & Woessner, P.A.

(57) ABSTRACT

Briefly, in accordance with one embodiment of the invention, a channel state information packet is encoded by a receiver side device and is fed back to the transmitter side device. The transmitter side device decodes the channel state information packet to extract an estimate of the channel response function.

22 Claims, 3 Drawing Sheets

OTHER PUBLICATIONS

Larsson, Erik G., "Joint Symbol Timing and Channel Estimation for OFDM Based WLANs", *IEEE Communications Letters*, 5(8), (Aug. 2001),325-327.

Moghaddam, P. H., et al., "A New Algorithm for Multipath Time Delay Estimation in Low SNR Using MLE Method", *Proceedings of the 1998 International Symposium on Underwater Technology*, (1998), 35-38.

Onizawa, T., et al., "A Simple Adaptive Channel Estimation Scheme for OFDM Systems", *Vehicular Technology Conference (VTC '99)*, (1999), 279-283.

Van Nee, R., et al., "Chapter 2—OFDM Basics", *In: OFDM Wireless Multimedia Communications*, Artech House,(2000), 33-51.

Van Nee, R., et al., "Chapter 5—Coherent and Differential Detection", *In: OFDM Wireless Multimedia Communications*, Artech House, (2000), 95-117.

\* cited by examiner

CHANNEL ESTIMATION FEEDBACK IN AN ORTHOGONAL FREQUENCY DIVISION MULTIPLEXING SYSTEM OR THE LIKE

BACKGROUND OF THE INVENTION

In a wireless local area network (WLAN) communication system such as an orthogonal frequency division multiplexing (OFDM) system, the data rate and quality at which a transmitter is able to transmit data to a receiver may be limited by the quality of the channel. However, a typical transmitter does not have the benefit of channel information when making such adjustments to the data rate and modulation scheme. Furthermore, without knowledge of the channel information, the transmitter may spend more energy than is necessary for exchanging data and other information between the transmitter and the receiver, thereby resulting in wasted power.

DESCRIPTION OF THE DRAWING FIGURES

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 3 is a diagram of a channel estimation feedback decoder in accordance with one embodiment of the present invention; and It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Some portions of the detailed description that follows are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as processing, computing, calculating, determining, or the like, refer to the action or processes of a computer or computing system, or similar electronic computing device, that manipulate or transform data represented as physical, such as electronic, quantities within the registers or memories of the computing system into other data similarly represented as physical quantities within the memories, registers or other such information storage, transmission or display devices of the computing system.

Embodiments of the present invention may include apparatuses for performing the operations herein. This apparatus may be specially constructed for the desired purposes, or it may comprise a general purpose computing device selectively activated or reconfigured by a program stored in the device. Such a program may be stored on a storage medium, such as, but is not limited to, any type of disk including floppy disks, optical disks, CD-ROMs, magnetic-optical disks, read-only memories (ROMs), random access memories (RAMs), electrically programmable read-only memories (EPROMs), electrically erasable and programmable read only memories (EEPROMs), flash memory, magnetic or optical cards, or any other type of media suitable for storing electronic instructions, and capable of being coupled to a system bus for a computing device.

The processes and displays presented herein are not inherently related to any particular computing device or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

In the following description and claims, the terms coupled and connected, along with their derivatives, may be used. In particular embodiments, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

It should be understood that embodiments of the present invention may be used in a variety of applications. Although the present invention is not limited in this respect, the circuits disclosed herein may be used in many apparatuses such as in the transmitters and receivers of a radio system. Radio systems intended to be included within the scope of the present invention include, by way of example only, wireless local area networks (WLAN) devices and wireless wide area network (WWAN) devices including wireless network interface devices and network interface cards (NICs), base stations, access points (APs), gateways, bridges, hubs, cellular radiotelephone communication systems, satellite communication systems, two-way radio communication systems, one-way pagers, two-way pagers, personal communication systems (PCS), personal computers (PCs), personal digital assistants (PDAs), and the like, although the scope of the invention is not limited in this respect.

Types of wireless communication systems intended to be within the scope of the present invention include, although not limited to, Wireless Local Area Network (WLAN), Wireless Wide Area Network (WWAN), Code Division Multiple Access (CDMA) cellular radiotelephone communication systems, Global System for Mobile Communications (GSM) cellular radiotelephone systems, North American Digital Cellular (NADC) cellular radiotelephone systems, Time Division Multiple Access (TDMA) systems, Extended-TDMA (E-TDMA) cellular radiotelephone systems, third generation (3G) systems like Wide-band CDMA (WCDMA), CDMA-2000, and the like, although the scope of the invention is not limited in this respect.

Figure 1:
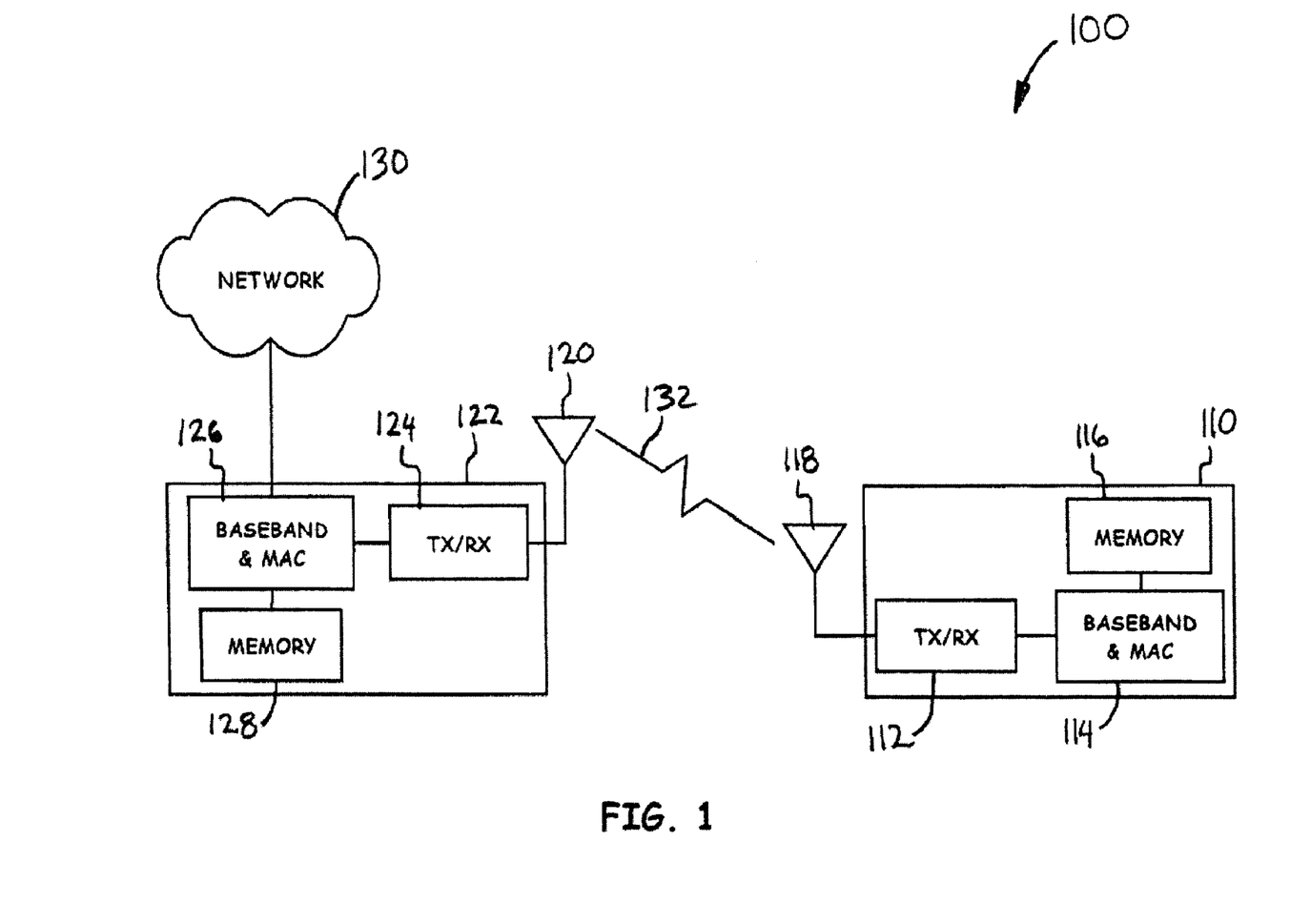
FIG. 1 is a block diagram of a wireless local area network communication system in accordance with one embodiment of the present invention.

Referring now to FIG. 1, a wireless local area network communication system in accordance with one embodiment of the present invention will be discussed. In the WLAN communication system 100 shown in FIG. 1, a mobile unit 110 may include a wireless transceiver 112 to couple to an antenna 118 and to a processor 114 to provide baseband and media access control (MAC) processing functions. Processor 114 in one embodiment may comprise a single processor, or alternatively may comprise a baseband processor and an applications processor, although the scope of the invention is not limited in this respect. Processor 114 may couple to a memory 116 which may include volatile memory such as DRAM, non-volatile memory such as flash memory, or alternatively may include other types of storage such as a hard disk drive, although the scope of the invention is not limited in this respect. Some portion or all of memory 116 may be included on the same integrated circuit as processor 114, or alternatively some portion or all of memory 116 may be disposed on an integrated circuit or other medium, for example a hard disk drive, that is external to the integrated circuit of processor 114, although the scope of the invention is not limited in this respect.

Mobile unit 110 may communicate with access point 122 via wireless communication link 132, where access point 122 may include at least one antenna 120. In an alternative embodiment, access point 122 and optionally mobile unit 110 may include two or more antennas, for example to provide a spatial division multiple access (SDMA) system or a multiple input, multiple output (MIMO) system, although the scope of the invention is not limited in this respect. Access point 122 may include a transceiver 124, processor 126, and memory 128 which may be similar to transceiver 112, processor 114, and memory 116 of mobile unit 116, although the scope of the invention is not limited in this respect. Access point 122 may couple with network 130 so that mobile unit 110 may communicate with network 130, including devices coupled to network 130, by communicating with access point 122 via wireless communication link 132. Network 130 may include a public network such as a telephone network or the Internet, or alternatively network 130 may include a private network such as an intranet, or a combination of a public and a private network, although the scope of the invention is not limited in this respect. Communication between mobile unit 110 and access point 122 may be implemented via a wireless local area network (WLAN), for example a network compliant with a an Institute of Electrical and Electronics Engineers (IEEE) standard such as IEEE 802.11a, IEEE 802.11b, HiperLAN-II, and so on, although the scope of the invention is not limited in this respect. In another embodiment, communication between mobile unit 110 and access point 122 may be at least partially implemented via a cellular communication network compliant with a 3GPP standard, although the scope of the invention is not limited in this respect.

Figure 2:
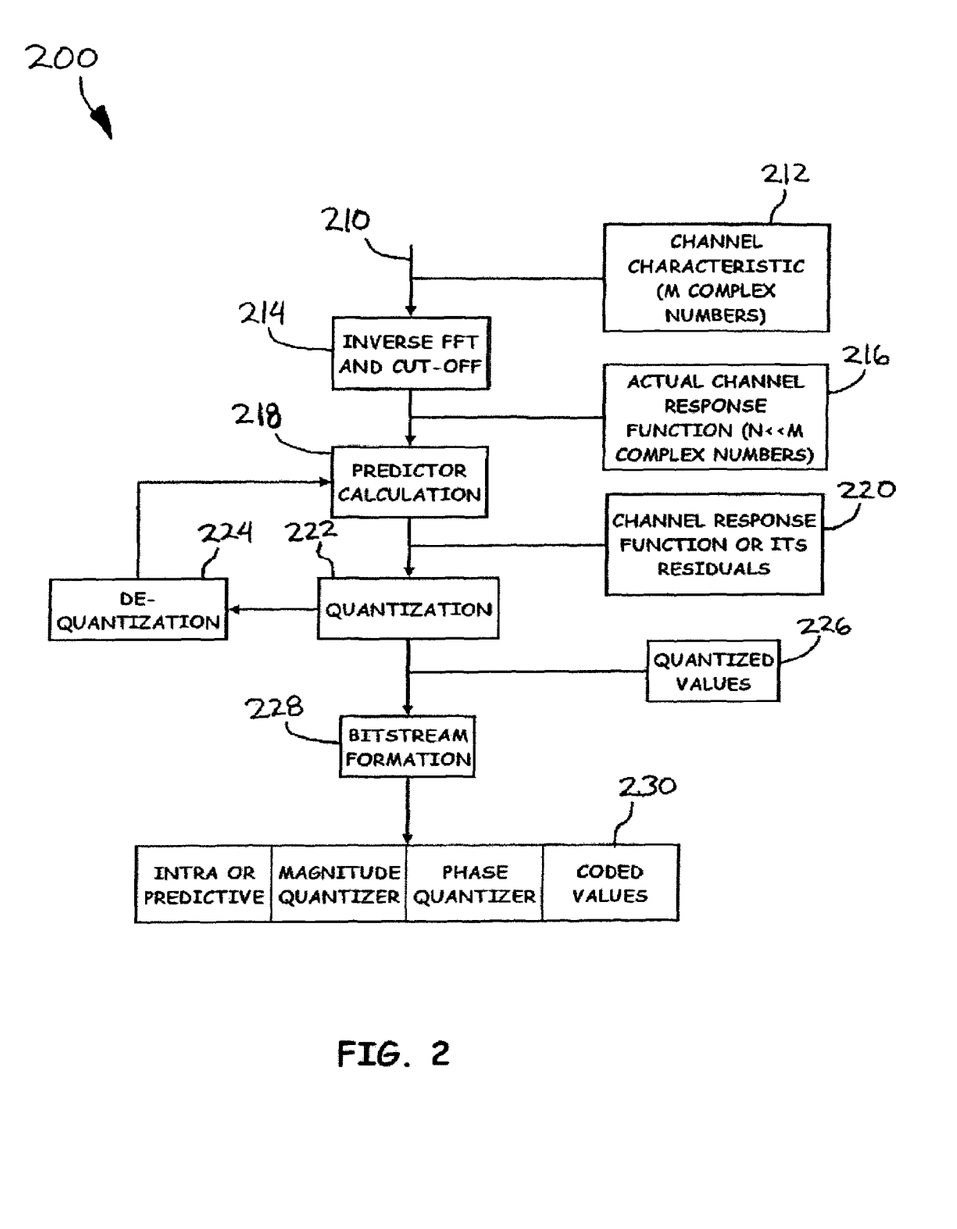
FIG. 2 is a diagram of a channel estimation feedback encoder in accordance with one embodiment of the present invention.

Referring now to FIG. 2, a diagram of a channel estimation feedback encoder in accordance with one embodiment of the present invention will be discussed. Channel estimation feedback encoder 200 may be implemented in a receiver of either transceiver 112 of mobile unit 110, or may be implemented in a receiver of transceiver 124 of access point 122. In accordance with one embodiment of the invention, when a first device transmits to a second device, an estimate of the channel, or channel state information (CSI) packet, may be fed back from the second device to the first device, for example to adapt transmission modulation according to the characteristics of the channel. In one particular embodiment, channel state information may consist of a channel transfer function estimate in frequency domain or channel response function estimate in time domain. In an alternative embodiment, a remote user may process channel function estimates itself, for example using bit and power loading block, and then transmit power allocation and modulation type instructions as the ready to use channel state information back to the original transmitting device, although the scope of the invention is not limited in this respect.

For purposes of discussion herein, the first device may be access point 122 and the second device may be mobile unit 110 where the transmitter in transceiver 124 of access point 122 transmits to the receiver of mobile unit 110, although the scope of the invention is not limited in this respect. In such an embodiment, the channel estimation feedback encoder 200 of FIG. 2 may be tangibly embodied in mobile unit 110, and the channel estimation feedback decoder 300 of FIG. 3 may be tangibly embodied in access point 122, although the scope of the invention is not limited in this respect. In an alternative embodiment, the channel estimation feedback encoder 200 may be embodied in access point 122 and the channel estimation feedback decoder 300 may be embodied in mobile unit 110, although the scope of the invention is not limited in this respect. In yet a further embodiment, a channel estimation feedback encoder 200 and a channel estimation feedback decoder 300 may be both embodied in both access point 122 and mobile unit 110 wherein encoding and decoding is performed by either access point 122 or mobile unit 110 bases on which unit is transmitting and which unit is receiving, although the scope of the invention is not limited in this respect. Furthermore, although the wireless LAN system 100 of FIG. 1 shown as an example illustrating an access point 122 and a mobile unit in a basic service set (BSS) or infrastructure mode, the invention may be implemented in an independent basic service set (IBSS) or ad-hoc mode, for example where mobile unit 110 may communicate with one or more other mobile units in lieu of access point 122, although the scope of the invention is not limited in this respect.

In accordance with the present invention, the channel estimation feedback encoder 200 may generate a channel estimate or Channel State Information (CSI) packet, such as represented by bitstream 230, to be fed back from mobile unit 110 to access point 122 after a transmission from access point 122 to mobile unit 110 has occurred. For example, the channel estimate information may be included as a part of the acknowledgement frame sent by mobile unit 110 to access point 122 after receiving a packet of data transmitted from access point 122 to mobile unit 110. Channel estimation feedback encoder 200 may execute an algorithm to encode the channel estimation information to be fed back to access point 122. The input 210 to channel estimation feedback encoder 200 may be the actual channel characteristic in the frequency domain, for example channel transfer function coefficients from a standard channel estimator of the receiver in transceiver 112 of mobile unit 110 in accordance with the IEEE 802.11a standard. As indicated at block 212, the channel characteristic may comprise M complex number, for example M=52 in accordance with the IEEE 802.11a standard.

The output encoder 200 may be the CSI packed into a bit stream. The algorithm executed by encoder 200 may include one or more optional features, for example to allow a varying level of complexity and information compression ratio. In one or more embodiments of the invention, one such option may be to ensure the best quality, or a near best quality, of the channel estimation or alternatively to minimize the time for encoding feedback packet, or yet alternative to minimize the value of the CSI. In accordance with one embodiment of the present invention, the algorithm executed by channel estimation feedback encoder 200 may permit two kinds of the channel estimation packets: an INTRA (I) packet or a PREDICTIVE (P) packet. The INTRA packet may contain all the data necessary to reconstruct the channel characteristic in the frequency domain. The INRTA packet may be utilized as a first feedback packet or after a long connection interruption. The PREDICTIVE packet may contain the differences between a current packet and a channel estimation (CE). Such PREDICTIVE packets may be utilized for successive improvement of the channel estimation accuracy or to indicate that the channel characteristic may have changed. To encode and decode such packets both the receiver and the transmitter may keep and update a current channel estimation according to the following rule:

CE=I, if current packet is Intra;

CE=CE+P, if current packet is Predictive.

Coding of the channel estimation (CE) packet may consist of four stages of encoder 200 as shown in FIG. 2: Inverse Fast Fourier Transform and Data Cut-Off block 214, Predictor Calculation block 218 (for P Packets), Data Quantization block 220, and Bitstream Formation block 228.

As shown in FIG. 2, Inverse FFT and Cut-Off block 214 may perform an Inverse Fast Fourier Transform (IFFT) is on an input array of M complex numbers received at input 210 to obtain a representation of the signal in the time-domain, the channel response function, as an array of complex numbers in a magnitude and phase representation. The signal may be cut-off at N complex numbers having time delays that are less than a channel delay spread, where for example N may be less than M, and the channel delay spread may be less than 800 ns, although the scope of the invention is not limited in this respect. Thus, the output of Inverse FFT and Cut-Off block 214 may represent an actual channel response function 216 represented by N complex numbers. In an alternative embodiment, Inverse FFT and Cut-Off block 210 may be optionally omitted wherein the channel state information may be directly encoded in the frequency domain. In other embodiment of the invention, another some special processing algorithm may be utilized instead of an Inverse FFT at Inverse FFT and Cut-Off block 210 to calculate a transmission modulation request, although the scope of the invention is not limited in this respect.

Where PREDICTIVE (P) packets are utilized, predictor calculation block 218 may evaluate the difference between an actual channel response function 216 provided by Inverse FFT and Cut-Off block 214 and a channel estimate as follows:

Predictor=Actual Data−Channel Estimate

In one embodiment, this subtraction may be performed for both magnitude and phase values on all samples in the array of actual channel response function 216, although the scope of the invention is not limited in this respect. The output of predictor calculation block 218 may be a channel response function or residuals of the channel response function 220.

Quantization block 220 may quantize the N complex numbers of the channel response function or its residuals 220. In one embodiment, quantization block 220 may perform a linear quantization in which samples in the channel response function array 220 are divided by a fixed quantizer value. Different quantizer values may be utilized for phase and magnitude components. In one particular embodiment, quantizer values may be a power of 2. Such a linear quantization may be utilized for PREDICTIVE (P) packets. In another embodiment, quantization block 220 may perform a channel attenuation estimation. In such an embodiment, quantization block 220 may estimate a time delay attenuation function of the magnitude of a given ray where the magnitude is $e^{-at}$ where a is attenuation. In one embodiment, aln2 may be estimated. Such a channel attenuation estimation performed by quantization block 220 may be utilized for INTRA (I) packets. Quantizer values may be chosen on the basis of some a priori, or advanced, knowledge of the channel response function distribution or the time history of the channel response function by utilizing an iterative procedure to ensure the coded data may fit into a predefined packet size and with a minimal loss of the information. The output of quantization block 222 may be quantized values 226 of the channel response function 220, which may be fed back to predictor calculation block 218 via a de-quantization block 224, although the scope of the invention is not limited in this respect.

At Bitstream formation block 228, fixed length coding may be performed on quantized values 226, for example using 1 or 2 bits per value, and other parameters for the channel characteristic. The output of bitstream formation block 228 may be bitstream 230 having a four part structure that may include an indicator of the packet kind whether INTRA or PREDICTIVE, a magnitude quantizer value or a binary logarithm thereof, a phase quantizer value or a binary logarithm thereof, and the coded values of the quantized channel response function, although the scope of the invention is not limited in this respect. The bitstream 230 may then be transmitted back to the original transmitter which may then decode the bitstream to obtain the channel state estimation, although the scope of the invention is not limited in this respect.

Figure 3:
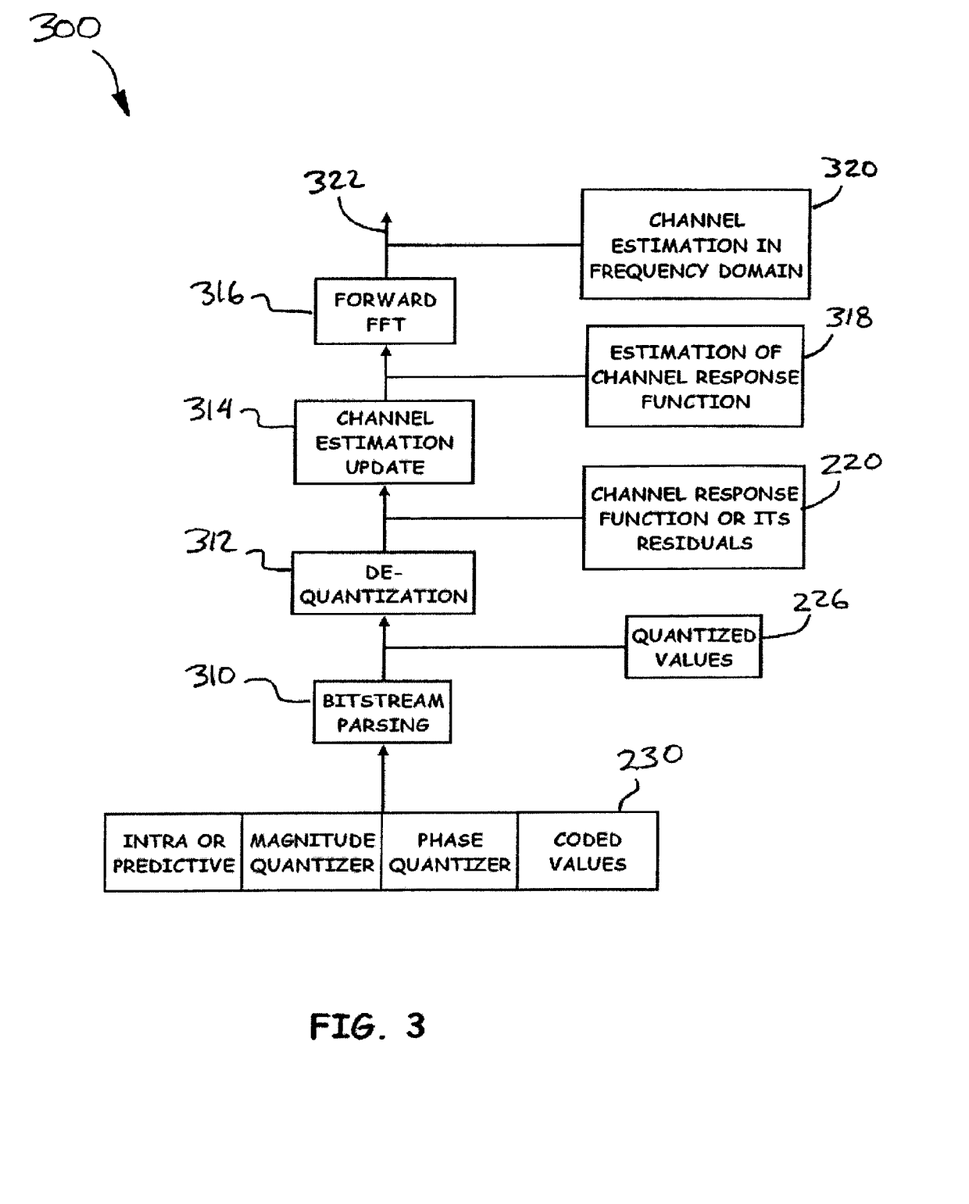

Referring now to FIG. 3, a diagram of a channel estimation feedback decoder in accordance with one embodiment of the present invention will be discussed. As shown in FIG. 3, the original transmitter may receive the bitstream 230 from the original receiver where the bitstream 230 was encoded by the encoder 200 of FIG. 2. A bitstream parsing block 310 may extract the bitstream parameters from bitstream 230. The quantized values 226 extracted from bitstream 230 may be de-quantized with de-quantization block 312, for example by multiplying the phase and magnitude values of quantized values by the corresponding phase or magnitude quantizer values as extracted from bitstream 230 and as utilized during by quantization block 220 of FIG. 2, although the scope of the invention is not limited in this respect. The output of de-quantization block 312 may be the channel response function for I packets, or the residuals of the channel response function for P packets 220, although the scope of the invention is not limited in this respect.

Channel estimation update block 314 may perform a channel estimation (CE) update for the current channel according to the following rule:

CE=I if the current packet is INTRA;
CE=CE+P if the current channel is PREDICTIVE.

The output of channel estimation update block 314 may be an estimation of the channel response function 318 for the current channel. Forward FFT block 316 may perform a forward Fast Fourier Transform (FFT) on the estimation of the channel response function 318 to provide a channel estimation in the frequency domain 320 at output 322, although the scope of the invention is not limited in this respect. The original transmitter may then utilize the channel estimation 320 for subsequent transmissions to the original receiver, for example to adjust the modulation scheme to the current channel conditions, although the scope of the invention is not limited in this respect.

Although the invention has been described with a certain degree of particularity, it should be recognized that elements thereof may be altered by persons skilled in the art without departing from the spirit and scope of the invention. It is believed that the channel estimation feedback in an orthogonal frequency division multiplexing system or the like of the present invention and many of its attendant advantages will be understood by the forgoing description, and it will be apparent that various changes may be made in the form, construction and arrangement of the components thereof without departing from the scope and spirit of the invention or without sacrificing all of its material advantages, the form herein before described being merely an explanatory embodiment thereof, and further without providing substantial change thereto. It is the intention of the claims to encompass and include such changes.

What is claimed is:

1. A method for channel estimation in an OFDM system, the method comprising:
   quantizing a channel response function of a signal received from a transmitter or a residual value of the channel response function, wherein the channel response function is represented by M complex numbers, wherein a channel estimate is subtracted from the channel response function to provide the residual value;
   limiting the channel response function to N complex numbers where N is less than M, wherein the N complex numbers are limited to values having time delays less than a predetermined delay spread;
   converting the signal from a frequency domain representation of the signal to a time domain representation of the signal prior to said quantizing; and
   generating a channel state information packet to be transmitted back to the transmitter, wherein the packet includes the quantized channel response function when the packet is a first feedback packet sent to the transmitter or a first feedback packet sent after a channel interruption, and includes the quantized residual value of the channel response function otherwise, and
   wherein the channel state information permits the transmitter to obtain a channel state estimation.

2. The method as claimed in claim 1, further comprising converting the signal from at least one of a frequency domain representation or a time domain representation to power allocation and modulation type instructions prior to said quantizing.

3. The method as claimed in claim 1, further comprising converting the signal from a frequency domain representation of the signal to a time domain representation of the signal prior and then calculating a channel response function on the signal prior to said quantizing, wherein said calculating includes said subtracting a channel estimate from the channel response function to provide a residual value of the channel response function.

4. The method as claimed in claim 1, wherein said quantizing includes estimating a time delay attenuation of the channel response function.

5. An article comprising:
   a storage medium having stored thereon instructions that, when executed by a computing platform, result in the encoding of a channel state information packet by:
   quantizing a channel response function of a signal received from a transmitter or a residual value of the channel response function, wherein the channel response function is represented by M complex numbers, and wherein a channel estimate is subtracted from the channel response function to provide the residual value;
   limiting the channel response function to N complex numbers where N is less than M, wherein the N complex numbers are limited to values having time delays less than a predetermined delay spread;
   converting the signal from a frequency domain representation of the signal to a time domain representation of the signal prior to said quantizing; and
   generating a channel state information packet to be transmitted back to the transmitter, wherein the packet includes the quantized channel response function when the packet is a first feedback packet sent to the transmitter or a first feedback packet sent after a channel interruption, and includes the quantized residual value of the channel response function otherwise, and
   wherein the channel state information permits the transmitter to obtain a channel state estimation.

6. The article as claimed in claim 5, wherein the instructions, when executed, further result in the encoding of a channel state information packet by converting the signal from at least one of a frequency domain representation or a time domain representation to power allocation and modulation type instructions prior to said quantizing.

7. The article as claimed in claim 5, wherein the instructions, when executed, further result in the encoding of the channel state information packet by calculating the channel response function on the signal prior to said quantizing, wherein said calculating includes said subtracting a channel estimate from the channel response function to provide a residual value of the channel response function wherein the channel state information packet includes the quantized channel response function when at least one of the channel state information packet is a first feedback packet, or there is an interruption in the connection.

8. The article as claimed in claim 5, wherein the instructions, when executed, further result in the encoding of a channel state information packet by converting the signal from a frequency domain representation of the signal to a time domain representation of the signal prior and then calculating a channel response function on the signal prior to said quantizing.

9. The article as claimed in claim 5, wherein said quantizing includes estimating a time delay attenuation of the channel response function.

10. A method for channel estimation in an OFDM system, the method comprising:
    parsing a channel state information packet received from a device after transmitting a signal to the device to obtain a quantized channel response function of the signal, wherein the device converts the signal from a frequency domain representation of the signal to a time domain representation of the signal prior to quantization, wherein the channel state information packet includes the quantized channel response function when the packet is a first feedback packet sent to the transmitter or a first feedback packet sent after a channel interruption and includes a quantized residual value of the channel response function otherwise, wherein a channel estimate is subtracted from the channel response function to provide the residual value; and dequantizing the quantized channel response function to provide a channel response function, wherein the channel response function is an estimate of the channel response function, wherein the estimate of the channel response function is represented by N complex numbers, wherein the channel response function is represented by M complex numbers, and wherein N is less than M.

11. The method as claimed in claim 10, further comprising, calculating an updated estimate of the channel response function by adding a current estimate of the channel response function to the residual of the channel response function when the channel response function of the channel state information packet is represented as a residual of the channel response function.

12. The method as claimed in claim 10, further comprising, where the channel response function is a time domain representation, converting the time domain representation of the channel response function to a frequency domain representation of the channel response function.

13. An article, comprising:
a storage medium having stored thereon instructions that, when executed by a computing platform, result in the decoding of a channel state information packet by:
parsing a channel state information packet received from a device after transmitting a signal to the device to obtain a quantized channel response function of the signal wherein the channel state information packet includes the quantized channel response function when the packet is a first feedback packet sent to the transmitter or a first feedback packet sent after a channel interruption and includes a quantized residual value of the channel response function otherwise, wherein a channel estimate is subtracted from the channel response function to provide the residual value, and wherein the device converts the signal from a frequency domain representation of the signal to a time domain representation of the signal prior to quantization; and dequantizing the quantized channel response function to provide a channel response function, wherein the channel response function is an estimate of the channel response function, wherein the estimate of the channel response function is represented by N complex numbers, wherein the channel response function is represented by M complex numbers, and wherein N is less than M.

14. The article as claimed in claim 13, wherein the instructions, when executed, further result in the decoding of a channel state information packet by calculating an updated estimate of the channel response function by adding a current estimate of the channel response function to the residual of the channel response function when the channel response function of the channel state information packet is represented as a residual of the channel response function.

15. The article as claimed in claim 13, wherein the instructions, when executed, further result in the decoding of a channel state information packet by, where the channel response function is a time domain representation, converting the time domain representation of the channel response function to a frequency domain representation of the channel response function.

16. An apparatus, comprising:
a baseband processor; and
a transceiver to couple to said baseband processor and an omnidirectional antenna;
wherein said baseband processor:
quantizes a channel response function of a signal received from a transmitter via said transceiver or a residual value of the channel response function, wherein the channel response function is represented by M complex numbers, and wherein a channel estimate is subtracted from the channel response function to provide the residual value;
limits the channel response function to N complex numbers, wherein N is less than M wherein the N complex numbers are limited to values having time delays less than a predetermined delay spread;
converts the signal from a frequency domain representation of the signal to a time domain representation of the signal prior to quantizing the channel response function; and
generates a channel state information packet to be transmitted back to the transmitter wherein the packet includes the quantized channel response function when the packet is a first feedback packet sent to the transmitter or a first feedback packet sent after a channel interruption, and includes the quantized residual value of the channel response function otherwise.

17. The apparatus as claimed in claim 16, wherein said baseband processor converts the signal from a frequency domain representation of the signal to a time domain representation of the signal prior to quantizing the channel response function.

18. The apparatus as claimed in claim 16, wherein said baseband processor calculates a channel response function on the signal prior to quantizing the channel response function or the residual value of the channel response function, and wherein the packet includes a quantized residual value of the channel response function when at least one of the channel state information packet is a first feedback packet, or there is an interruption in the connection.

19. The apparatus as claimed in claim 16, wherein said baseband processor converts the signal from a frequency domain representation of the signal to a time domain representation of the signal prior and then calculates a channel response function on the signal prior to quantizing the channel response function, by said subtracting a channel estimate from the channel response function to provide a residual value of the channel response function.

20. An apparatus, comprising:
a baseband processor; and
a transceiver to couple to said baseband processor and an omnidirectional antenna;
wherein said baseband processor parses a channel state information packet received from a device after transmitting a signal to the device to obtain a quantized channel response function of the signal to obtain a quantized channel response function of the signal, wherein the device converts the signal from a frequency domain representation of the signal to a time domain representation of the signal prior to quantizing the channel response function, wherein the channel state information packet includes the quantized channel response function when the packet is a first feedback packet sent to the transmitter or a first feedback packet sent after a channel interruption, and includes a quantized residual value of the channel response function otherwise, and dequantizes the quantized channel response function to provide a channel response function, and wherein the channel response function is an estimate of the channel response function, wherein the estimate of the channel response function is represented by N complex numbers, wherein the channel response function is represented by M complex numbers, and wherein N is less than M.

21. The apparatus as claimed in claim 20, wherein said baseband processor calculates an updated estimate of the channel response function by adding a current estimate of the channel response function to the residual of the channel response function when the channel response function of the channel state information packet is represented as a residual of the channel response function.

22. The apparatus as claimed in claim 20, wherein said baseband processor, where the channel response function is a time domain representation, converts the time domain representation of the channel response function to a frequency domain representation of the channel response function.

* * * * *

UNITED STATES PATENT AND TRADEMARK OFFICE
CERTIFICATE OF CORRECTION

PATENT NO.       : 7,639,643 B2                                    Page 1 of 1
APPLICATION NO.  : 10/665939
DATED            : December 29, 2009
INVENTOR(S)      : Sadri et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1064 days.

Signed and Sealed this

Twenty-first Day of December, 2010

David J. Kappos
*Director of the United States Patent and Trademark Office*